(12) United States Patent
Jozitis et al.

(10) Patent No.: US 7,123,716 B2
(45) Date of Patent: Oct. 17, 2006

(54) HEADSET CABLE RETAINER

(75) Inventors: Jason Jozitis, Hooksett, NH (US); Joe Feni, Hudson, NH (US)

(73) Assignee: GN Netcom Inc., Nashua, NH (US)

( * ) Notice: Subject to any disclaimer, the term of this patent is extended or adjusted under 35 U.S.C. 154(b) by 376 days.

(21) Appl. No.: 10/195,259

(22) Filed: Jul. 15, 2002

(65) Prior Publication Data

US 2004/0008839 A1    Jan. 15, 2004

(51) Int. Cl.
*H04M 1/15*   (2006.01)
*H01R 13/62*  (2006.01)

(52) U.S. Cl. .................. 379/438; D8/383; 439/369
(58) Field of Classification Search ............... 379/451, 379/438, 437; 439/371, 369; D8/356, 382, D8/383

See application file for complete search history.

(56) References Cited

U.S. PATENT DOCUMENTS

| 4,884,979 | A | * | 12/1989 | Budner ..................... 439/369 |
| 4,898,542 | A | * | 2/1990 | Jones, Jr. ................. 439/371 |
| 5,725,185 | A | | 3/1998 | Auclair |
| 6,033,251 | A | * | 3/2000 | Cook ........................ 439/371 |

* cited by examiner

*Primary Examiner*—Harry S. Hong
(74) *Attorney, Agent, or Firm*—Altera Law Group, LLC

(57) ABSTRACT

A retainer that is attachable to a set of interfacing cables prevents physical separation of the cables while allowing electrical disconnection of the cables. The retainer uses a body member with a hinged end cap on each end. The end caps include a snap pin and the ends of the body include receiving voids for the snap pins. The end caps can be locked into place by rotating around the hinged attachment until the snap pins engage the receiving voids. Either one or both of the end cap and elongated body have notches that form restraining voids when the end caps are locked in place.

13 Claims, 3 Drawing Sheets

HEADSET CABLE RETAINER

FIELD OF THE INVENTION

The invention relates generally to telephonic headsets and, in particular, a retainer for preventing loss or theft of a headset or other connectable device.

BACKGROUND OF THE INVENTION

Hands-free headsets are invaluable in office and call center applications where a user requires use of hands while conversing on the telephone. The headset is typically connected to a base unit, amplifier, or other electrical equipment via a cable. The cable usually includes a quick disconnect which provides a removable electrical connection to the base unit.

Although a quick disconnect is useful in making removal and replacement of headsets convenient, it has drawbacks, especially in a workplace setting such as a call center. The headsets can be expensive and are pilferable items. Also, the user may decide it is easier to disconnect the headset and wear it when leaving the workspace, rather than removing the headset from the user's head. This can lead to unintentional loss of the headset.

Electrical connectors are available that are permanent or difficult to remove without tools. These connectors can solve the problems of loss and theft, but make troubleshooting and replacement of the headset difficult. Further, such connectors may be non-standard, increasing manufacturing and maintenance costs.

Prior art solutions have utilized fasteners, lanyards (e.g. steel wire) and two piece clamps that, while effective, are expensive and time consuming to install. What is needed is an inexpensive, easy to install retainer for headsets and other electrical devices that are coupled using quick-disconnect connectors. Further, the retainer should allow an electrical disconnection for easy troubleshooting while still providing a mechanical restraint when electrically disconnected.

SUMMARY OF THE INVENTION

To overcome the limitations in the prior art described above, and to overcome other limitations that will become apparent upon reading and understanding the present specification, the present invention discloses a retainer for holding a disconnectable cable or other connecting device.

The present invention is directed towards a security retainer for a disconnectable cable set having a first and second cable. Each cable has an elongated portion and a connector at an end of the elongated portion. The security retainer includes a body having a first and second end. A first and second end cap is lockable to the first and second ends, respectively, of the body. The end caps and respective ends of the body form a first and second retaining void for the first and second cables when the end caps are locked to the respective ends. The elongated portion of the cables is placeable within the retaining voids. The connectors of the cables are not passable though the retaining voids.

The body of the security retainer may be elongated. The first and second end caps may each include a closeable end portion attached to the body. In another configuration, the retainer includes a first and second pivotable member between the first and second end caps and the respective first and second ends of the body. The pivotable members may each comprise a living hinge.

The first and second end caps may each include a snap pin. The body may include a first and second receiving void at the respective first and second ends of the body. The snap pins of the first and second end caps are one-way lockable with respective first and second receiving voids. A first and second inspection void may be included that intersects with and is substantially perpendicular to the respective first and second receiving voids. The inspection voids providing visual access to first and second snap pins when the snap pins are located within first and second receiving voids.

Alternatively, the first and second end caps may each include a receiving void and the body includes a first and second snap pin at the respective first and second ends of the body. The first and second snap pins are one-way lockable with the receiving voids of the first and second end caps.

In another embodiment, a cable assembly includes a first and second cable each having an elongated portion and a connector at an end of the elongated portion. The connector of the first cable removably mates with the connector of the second cable. The assembly includes a retainer having a body with a first and second end and a first and second end cap lockable to the respective first and second ends of the body. The end caps and ends of the body form first and second retaining voids when the end caps are locked with the respective ends of the body. The first and second cables are disposed within the first and second retaining voids, respectively. The elongated portion of the cables are placeable in the retaining voids and the connectors of the cables are not passable though the retaining voids, such that the connectors of the cables are connectable and disconnectable at a location between the retaining voids.

In another embodiment, a retainer is used for a disconnectable cable set having a first and second cable, each cable having an elongated portion and a connector at an end of the elongated portion. The retainer includes a body having a first and second end. Each end includes a receiving void and a retaining notch. The elongated portion of the first and second cables are locatable within the retaining notches of the respective first and second ends. A first and second pivot member are attached to the first and second ends, respectively, of the body. A first and second end cap are attached to the respective first and second pivot members. The end caps each include a snap pin. The snap pins are lockably insertable into the receiving void of respective ends of the body. Pivoting the caps about the pivot members moves the snap pins into the receiving voids. Locking insertion of the snap pins within receiving voids forms a first and second retaining void. The retaining voids have an opening smaller than a minimum outer dimension of the first and second connectors.

In another embodiment, a retainer is used for a disconnectable cable set having a first and second cable, each cable having an elongated portion and a connector at an end of the elongated portion. The retainer includes a body having a first and second end, each end including a receiving void. A first and second pivot member is attached to the respective first and second ends of the body. A first and second end cap is attached to the first and second pivot members, respectively. The end caps each include a snap pin and a retaining notch. The elongated portion of the first and second cables are locatable within the retaining notches of the end caps. The snap pins are lockably insertable into the receiving void of respective first and second ends of the body. Pivoting the end caps about the pivot members moves the snap pins into the receiving voids. Locking insertion of the pins within receiving voids forms a first and second retaining void. The retaining voids have an opening smaller than a minimum outer dimension of the first and second connectors.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
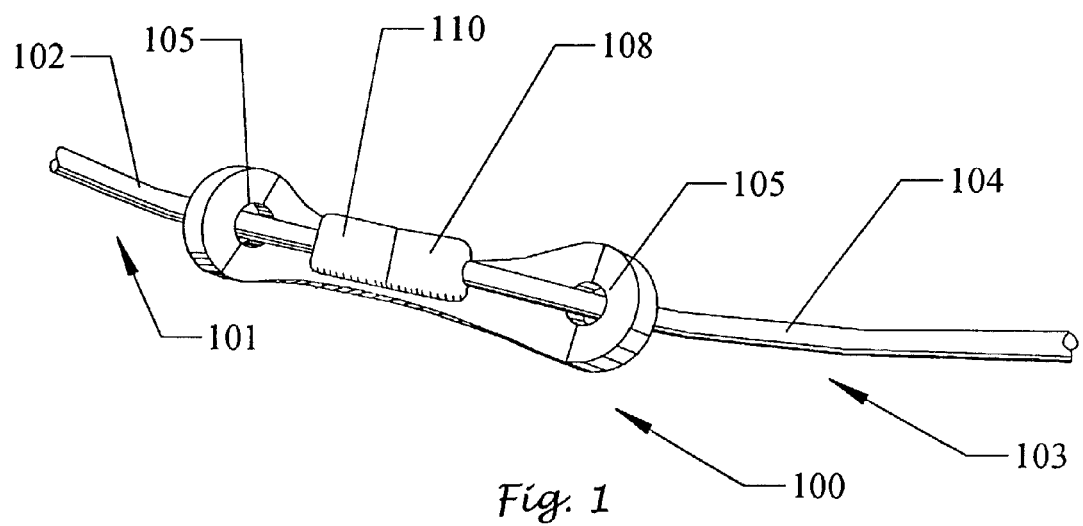
FIG. 1 illustrates a retainer according to the present invention securing an inline cable connection.

While the invention is amenable to various modifications and alternative forms, specifics thereof have been shown by way of example in the drawings and will be described in detail herein. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to FIG. 1, a retainer, generally indicated by reference numeral 100, is shown attached to two cables 101, 103. The two cables 101, 103 have elongated portions 102, 104, typically including one or more wires. Connectors 108, 110 are attached to an end of the elongated portions 102, 104. The cables 101, 103 are joined at the connectors 108, 110. The retainer 100 includes retaining voids 105 that are larger than or equal to a cross sectional dimension of the cable's elongated portions 102, 104, but smaller than a minimum outer dimension of the inline connectors 108, 110. This allows the elongated portions 102, 104 to be disposed within the void 105 but prevents the connectors 108, 110 from passing through the void 105. It can be seen that the retainer 100 deployed in this way prevents the physical separation of cables 101, 103 yet still allows the connectors 108, 110 to be disconnected for maintenance or troubleshooting. In order to completely separate the cables 101, 103, the retainer 100 and/or cables 101, 103 must be cut or otherwise destroyed. The use of the retainer 100 in this way thereby acts as a theft deterrent.

Figure 2:
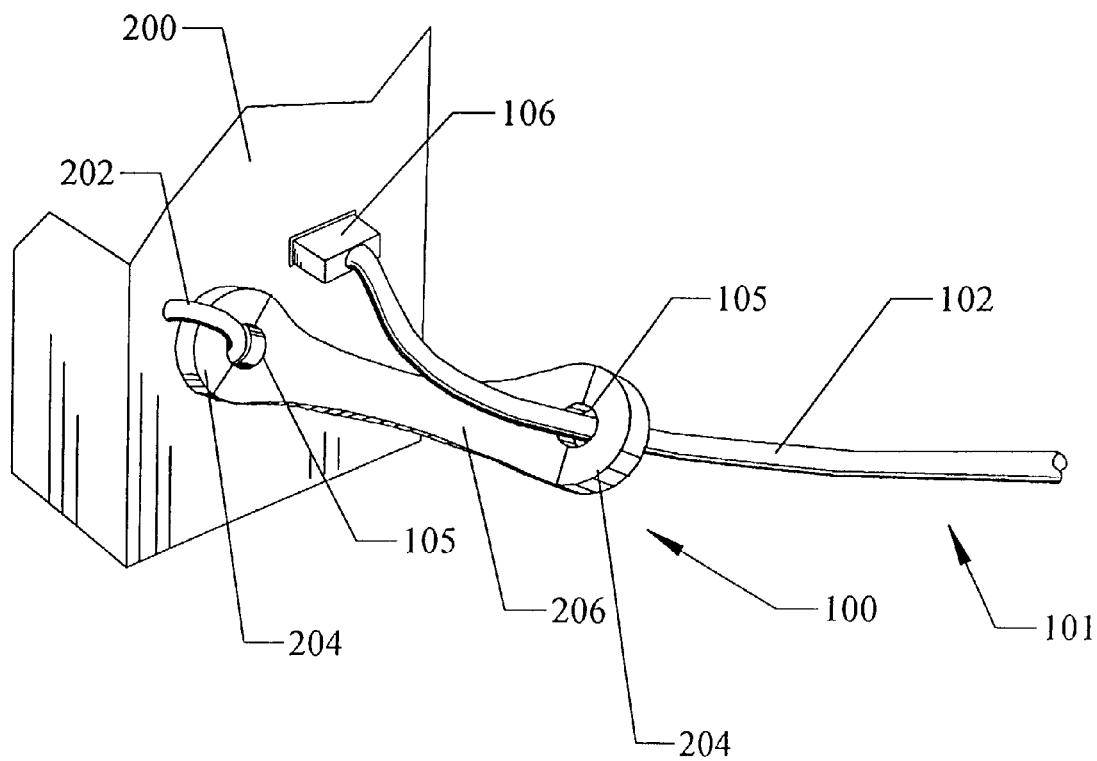
FIG. 2 illustrates a retainer according to the present invention securing a cable assembly to a fixed attachment point.

FIG. 2 shows an alternate deployment of a retainer 100 that secures a cable 101 to a piece of equipment 200. The cable 101 includes a connector 106 that attaches to the equipment 200. The equipment 200 contains an attachment point 202. In this example, the attachment point 202 is a loop. The retainer 100 is fastened to the attachment point 202 at one end and to an elongated portion of the cable 101 at the other end. This arrangement prevents the cable 101 from being removed while allowing an electrical disconnection of the cable 101 from the equipment 200.

A retainer 100 according to the present invention can be installed without requiring disassembly of the cables 101, 103 and/or disassembly of a fixed attachment point 202. The retainer 100 includes end caps 204 and a body 206. In this example, the body 206 is elongated, although a non-elongated body may be useful in some configurations. The end caps 204 can be locked onto the body 206 and form the retaining voids 105 when so assembled. Cable(s) 101, 103 and/or attachment points 202 are trapped between the body 206 and end caps 204 prior to assembly, and thereafter enclosed in the void 105 when the end caps 204 are locked into place.

Figure 3:
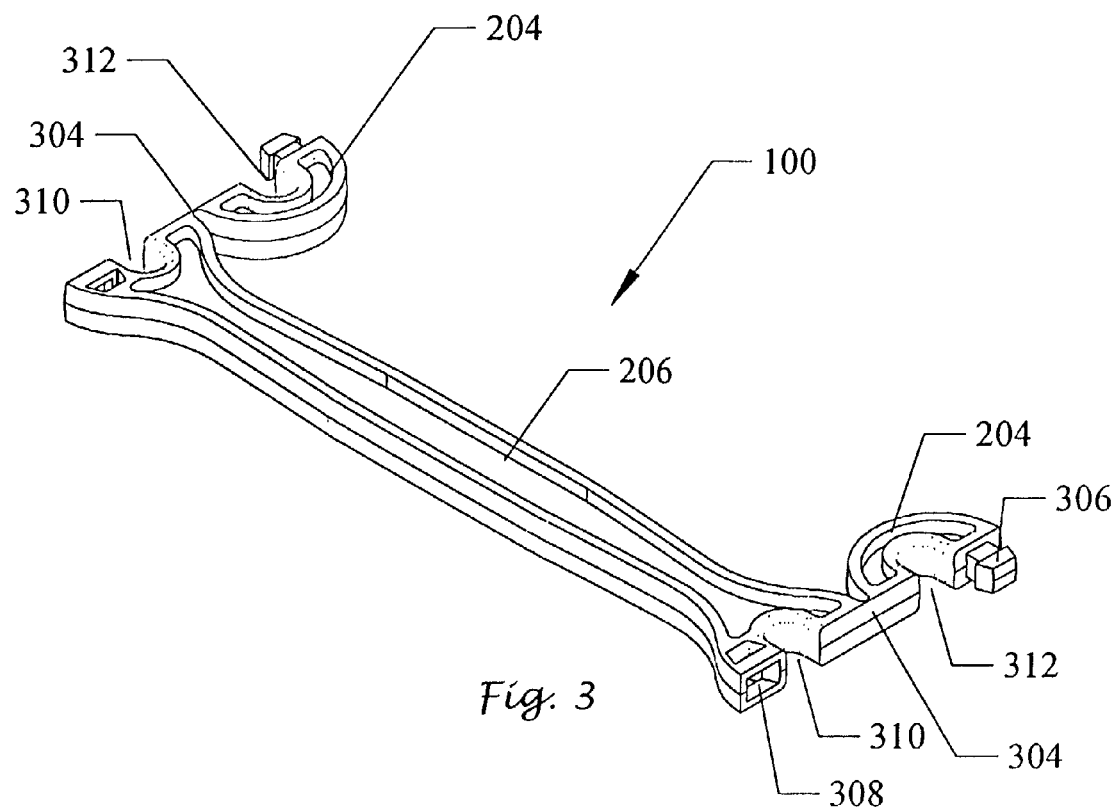
FIG. 3 is a perspective view of one embodiment of a retainer according to the present invention.

Particulars of an exemplary retainer 100 embodiment are shown in FIG. 3. The retainer 100 is preferably formed from a molded plastic such as polypropylene. It is appreciated the novel design as illustrated in FIG. 3 allows an entire functional retainer 100 to be formed as a single, molded piece. A single piece retainer 100 is a significant improvement over prior art devices, because it not only allows significant manufacturing and inventory cost savings, but also allows the retainer 100 to be very quickly installed. The retainer 100 includes an elongated body section 206 with two pivotably attached end caps 204. The end caps 204 are attached to the body 206 with molded "living" hinges 304. A living hinge, as is well known in the art, is a hinge formed from a thin strip of material (usually plastic) that connects between the pivotable objects. When the retainer 100 is formed from polypropylene, the living hinges 304 are formed by a strip of material about 0.5 mm thick.

Each end cap 204 includes a snap 306 that secures the end cap 204 to the elongated body 206 when assembled. The snap 306 includes a protruding pin with a wedge-shaped tip. The elongated body 206 includes a receiving void 308 for receiving the snap 306 upon assembly of the retainer 100. The ends of the elongated body 206 include retaining notches 310. The end caps 204 can also include retaining notches 312. The notches 310, 312 form the retaining void 105 when the end caps 204 are closed onto the body 206.

Figure 4:
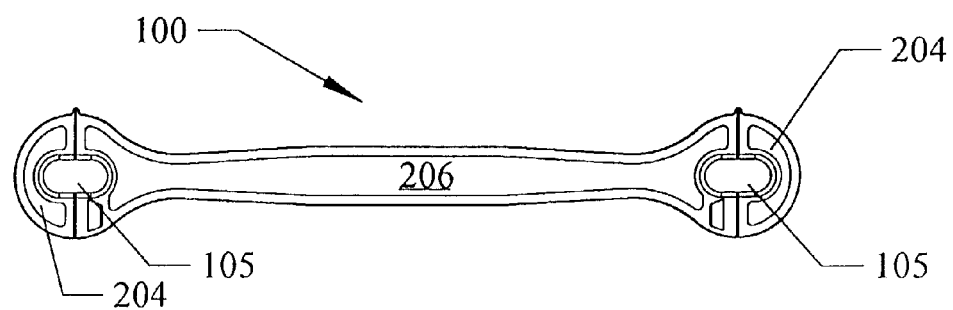
FIG. 4 is a side view of the retainer shown in FIG. 3.

FIG. 4 illustrates an assembled retainer 100 with the end caps 204 closed onto the body 206. The closure of the end caps 204 with body 206 forms retaining voids 105 for receiving a cable. Note that the assembled retainer 100 has a smooth outer profile. This is advantageous in preventing the retainer 100 from snagging on clothing or other items when deployed.

Figure 5:
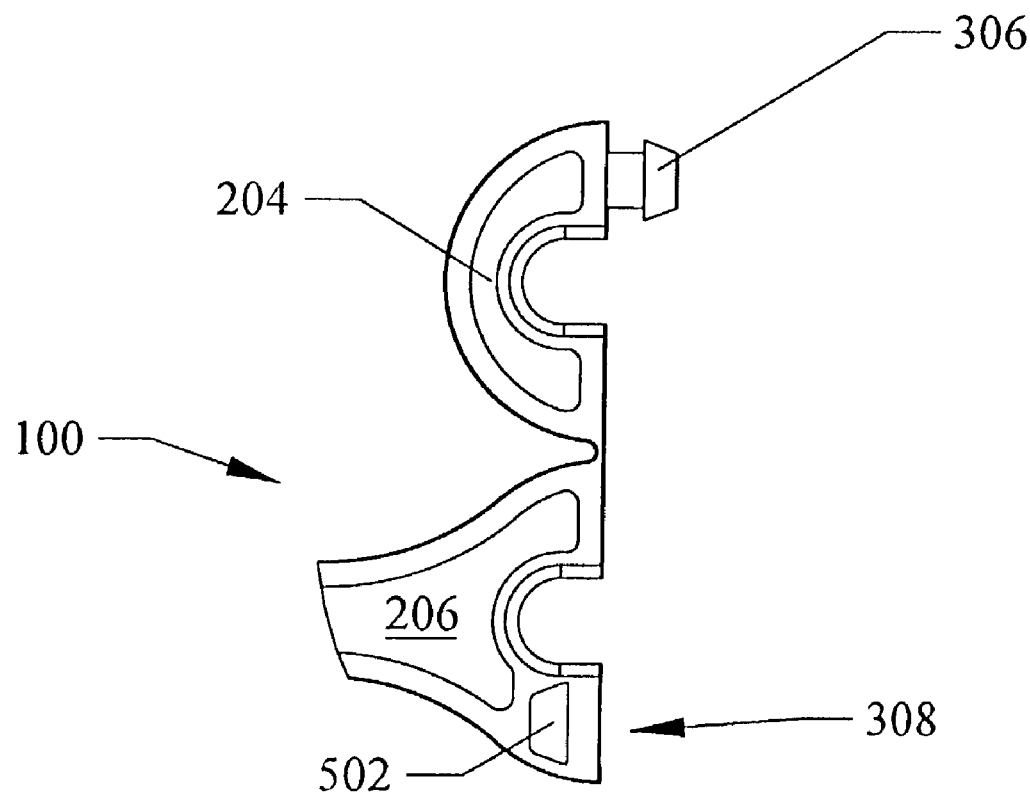
FIG. 5 is a detailed view of an end of the retainer.

A closer view of the snap 306 and receiving void 308 are shown in FIG. 5. The receiving void 308 preferably contains an inspection void 502 that passes through and substantially perpendicular to a portion of the void 308. The inspection void 502 simplifies the molding operation, and also provides a view of the snap 306 when assembled into the receiving void 308. In this way, the inspection void 502 can be used to allow positive verification that the snap 306 is fully engaged in the receiving void 308. The inspection void 502 also provides another surface for engagement of the snaps 306 when the snaps 306 contain wedge features on all fours sides.

Figure 6:
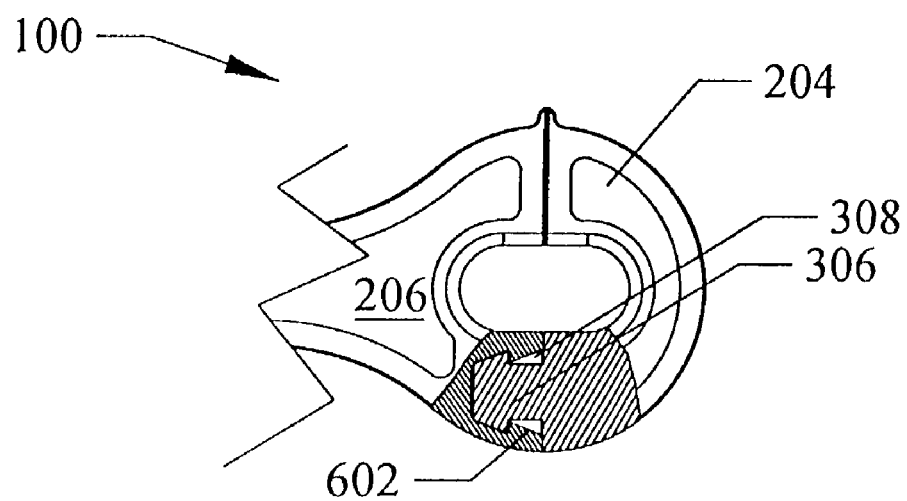
FIG. 6 is a partial cutaway view illustrating locking features of the retainer.

A cutaway view of the snap 306 installed in the receiving void 308 is shown in FIG. 6. The receiving void 308 includes a taper 602 that helps reduce the forces needed to push the snap 306 into the void 308. It is appreciated that the interference between the snap 306 and void 308 can be designed according to principles well known in the art such that the snap 306 is one-way lockable, e.g. removal of the snap 306 is difficult without damaging the retainer 100. In this way, any tampering with the retainer 100 in attempting to remove the snap 306 from the void 308 will be evident. Since the retainer 100 is inexpensive to make, requisite destruction of the retainer 100 for removal when inadvertently installed, for example, is not a serious disadvantage.

It is appreciated that alternate arrangements of a snap 306 and void 308 fall within the scope of the present invention. For example, the retainer 100 can be configured such that the snaps 306 are attached to the ends of the body 206 and the receiving voids 308 can be molded into the end caps 204. The snaps 306 can be formed by structures such as pins or tabs having wedged members or other friction lock features known in the art. In another variation, the end caps 204 or the body 206 may omit retaining notches 310, 312. In such a variation, the retaining void 105 is formed by one of the notches 310, 312 alone, the notches being closed on assembly by an edge of either the end caps 204 or the body 206, respectively.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A cable retainer assembly, for use with a first and second cable each having an elongated portion and a connector at an end of the elongated portion, the connector of the first cable removably mating with the connector of the second cable, said retainer assembly comprising:
   a retainer having a body with a first and second end and a first and second substantially inflexible end cap lockable to the respective first and second end of the body, the end caps extending from distal ends of the body and ends of the body forming first and second retaining voids when the end caps are locked with the respective ends of the body and being configured to pivot with respect to the body along a single pivot axis; and
   wherein the first and second cables are disposed within the first and second retaining voids, respectively, the elongated portion of the cables placeable and slidable in the retaining voids, the connectors of the cables not passable though the retaining voids, such that the connectors of the cables are connectable and disconnectable at a location between the retaining voids while still being retained by the retainer.

2. The cable assembly of claim 1, wherein the body of the retainer is elongated and wherein the first and second end caps of the retainer each comprise a closeable end portion attached to the body pivotable about only said axis, and
   wherein the first and second end caps each include a snap pin and the body includes a first and second receiving void at the respective first and second ends, said snap pins having ends entirely receivable within said receiving voids, first and second separate inspection voids in said body each intersecting with said receiving voids, the inspection voids providing visual access to the first and second snap pins when the snap pins are located within the first and second receiving voids; so that a user can verify that the snap pins are secured within the receiving voids.

3. The cable assembly of claim 1, wherein the first and second end caps of the retainer each comprise a closeable end portion attached to the body.

4. The cable assembly of claim 1, further comprising a first and second pivotable member, having a pivoting axis, connecting the first and second end caps with respective first and second ends of the body, and wherein said ends caps are substantially rigid, whereby said end caps are pivotable from an open and closed position from entirely from rotation about said pivoting axis.

5. The cable assembly of claim 4, wherein the pivotable members each comprise living hinges.

6. The cable assembly of claim 1, wherein the first and second end caps each include a snap pin and the body includes a first and second receiving void at the respective first and second ends, and wherein the snap pins of the first and second end caps are one-way lockable with the respective first and second receiving voids.

7. The cable assembly of claim 1, further comprising a first and second inspection void each intersecting with and substantially perpendicular to the first and second receiving voids, the inspection voids providing visual access to the first and second snap pins when the snap pins are located within the first and second receiving voids.

8. The cable assembly of claim 1, wherein the first and second end caps each include a receiving void and the body includes a first and second snap pin at the respective first and second ends, and wherein the first and second snap pins are one-way lockable with the receiving voids of the first and second end caps.

9. The cable assembly of claim 8, further comprising a first and second inspection void intersecting with and substantially perpendicular to the respective first and second receiving voids, the inspection voids providing visual access to the first and second snap pins when the snap pins are located within first and second receiving voids.

10. A retainer for a disconnectable cable set having a first and second cable, each cable having an elongated portion and a connector at an end of the elongated portion, the retainer comprising:
   a body having a thickness and an elongated surface defining a first plane, said surface being wider than said thickness, a first and second end, each end including a receiving void and a retaining open ended recess into each end, the elongated portion of the first and second cables locatable within the retaining recesses of the respective first and second ends;
   a first and second pivot member attached to the first and second ends, respectively, of the body; and
   a first and second end cap attached to the respective first and second pivot members, said end caps extending from distal ends of the body and being pivotable from an unlocked to locked position in substantially the same plane as said plane as the elongated surface.

11. The retainer of claim 10 wherein said elongated body is substantially planar.

12. The retainer of claim 10, wherein said end caps pivot with respect to said elongated portion and in the same plane.

13. The retainer of claim 11, wherein the first and second pivot members each comprise living hinges aligned axially in a plane not coplanar with said elongated member.

* * * * *